(12) United States Patent
Yao

(10) Patent No.: US 11,449,680 B2
(45) Date of Patent: Sep. 20, 2022

(54) METHOD FOR TESTING MEDICAL DATA

(71) Applicant: SHANGHAI MINGPIN MEDICAL DATA TECHNOLOGY CO., LTD., Shanghai (CN)

(72) Inventor: Juanjuan Yao, Shanghai (CN)

(73) Assignee: SHANGHAI MINGPIN MEDICAL DATA TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/627,653

(22) PCT Filed: Jul. 17, 2020

(86) PCT No.: PCT/CN2020/102624
§ 371 (c)(1),
(2) Date: Jan. 15, 2022

(87) PCT Pub. No.: WO2021/008601
PCT Pub. Date: Jan. 21, 2021

(65) Prior Publication Data
US 2022/0207242 A1   Jun. 30, 2022

(30) Foreign Application Priority Data
Jul. 17, 2019  (CN) .......................... 201910644814.1

(51) Int. Cl.
*G06F 40/30*    (2020.01)
*G06V 30/19*    (2022.01)
(Continued)

(52) U.S. Cl.
CPC ........... *G06F 40/30* (2020.01); *G06K 9/6215* (2013.01); *G06V 30/1983* (2022.01);
(Continued)

(58) Field of Classification Search
CPC .............. G06F 40/30; G06V 30/19147; G06V 30/19093; G06V 30/1983; G06V 30/242; G06K 9/6215
See application file for complete search history.

(56) References Cited

U.S. PATENT DOCUMENTS 10,468,126 B1 *  11/2019  Harding ................ G06F 16/367
11,263,534 B1 *   3/2022  Prat ....................... G16B 50/10
(Continued)

FOREIGN PATENT DOCUMENTS

CN       105184307 A    12/2015
CN       107656952 A     2/2018
(Continued)

*Primary Examiner* — Kevin Ky
(74) *Attorney, Agent, or Firm* — Global IP Services; Tianhua Gu

(57) ABSTRACT

A method for testing medical data is provided. Each medical datum includes a plurality of information units and a plurality of separators, and the method includes the following steps: a. matching the medical data against a standard library including a plurality of patterns, a matching expression being: [\s\S][number/sequence/relation]&[\b\B] (S101); and b. determining, based on a matching result of the step a, whether the medical datum is qualified (S102). A standardized standard library is first established, a matching result is obtained by matching the medical datum and the standard library for a non-initial boundary, an initial boundary, an information quantity, information sequences, a semantic relationship quantity, a character boundary, and a non-character boundary, and whether the medical datum meets a requirement is further determined according to the matching result.

10 Claims, 4 Drawing Sheets

(51) Int. Cl.
    *G06K 9/62*           (2022.01)
    *G06V 30/196*      (2022.01)
    *G06V 30/242*      (2022.01)

(52) U.S. Cl.
    CPC .. *G06V 30/19093* (2022.01); *G06V 30/19147* (2022.01); *G06V 30/242* (2022.01)

(56) References Cited

U.S. PATENT DOCUMENTS

| | | | |
|---|---|---|---|
| 2007/0005596 A1 | 1/2007 | Brown et al. | |
| 2009/0119157 A1* | 5/2009 | Dulepet | G06Q 30/02 705/7.29 |
| 2015/0106125 A1* | 4/2015 | Farooq | G16H 40/20 705/3 |
| 2015/0347698 A1* | 12/2015 | Soni | G06N 5/047 706/11 |
| 2018/0082032 A1* | 3/2018 | Allen | G06F 40/289 |
| 2018/0082197 A1* | 3/2018 | Aravamudan | G06N 5/022 |
| 2019/0266243 A1* | 8/2019 | Farooq | G16H 10/60 |
| 2020/0160510 A1* | 5/2020 | Lindemer | G06N 3/084 |
| 2020/0185083 A1* | 6/2020 | Syeda-Mahmood | G06V 10/507 |
| 2021/0257066 A1* | 8/2021 | Chen | G06F 40/284 |
| 2022/0138599 A1* | 5/2022 | Aravamudan | G16B 50/10 706/55 |

FOREIGN PATENT DOCUMENTS

| | | |
|---|---|---|
| CN | 108447534 A | 8/2018 |
| CN | 110491519 A | 11/2019 |

\* cited by examiner

METHOD FOR TESTING MEDICAL DATA

CROSS REFERENCE TO RELATED PATENT APPLICATION

The present application is the US national stage of PCT/CN2020/102624 filed on 2020 Jul. 17, which claims the priority of the Chinese patent application No. 201910644814.1 filed on 2019 Jul. 17, which application is incorporated herein by reference.

FIELD OF TECHNOLOGY

The present invention relates to the field of big data processing, particularly to a method for medical data quality control, and specifically, to a method for testing medical data.

BACKGROUND

With the advent of big data era, various different types of data are collected and processed. As one of the most special types of data, medical data comprises various variables, including patient data, doctor data, disease data, symptom data, test data, diagnostic data, treatment data, and medicine data. For medical activities, their most important feature is that medical behaviors have a clear logic relationship among them, so that medical data also has a clear semantic relationship. Besides, medical data are generally inputted or generated by a doctor or a patient, and the semantic relationship among the data can reflect an interrelationship among decisions of the doctor with corresponding therapies and a disease development situation.

A medical data interaction process is characterized by the fact that generally a plurality of terminals participate in interaction, and each terminal has an independent demand, that is, requirements of the terminals on data quality, especially requirements on data structures are different from each other. Based on conventional data interaction theories, to implement strong logicality on interactions of a plurality of terminals, structures of medical data need to be unified first.

In existing medical data for applications in the field of artificial intelligence, one type is generated by mining medical record data of a certain hospital information system (HIS), which is generally referred to as structured information extraction; and another type is generated through separately modeling and refilling by medical workers. Both methods can obtain basic data that meet quality requirements of machine learning, but both methods are also time-consuming and costly.

From a business viewpoint, the two foregoing basic data obtaining methods are both originated from companies that are pioneers in the field of artificial intelligence, and a reason for using the two methods lies in the scarcity of medical data in these companies' home countries. The country the inventors are from has the largest population and number of medical visits in the world, it has a massive quantity of medical data, but the quality of those medical data is uneven. Based on this, if those medical data are processed by using the two foregoing methods, costs will be higher and more time may be consumed.

Therefore, developing a method that can pre-filter massive medical data quickly and perform further processing according to industry-universal manners based on pre-filtered data may lay a solid foundation for development of the medical artificial intelligence industry.

SUMMARY

A technical problem to be resolved by the technical solutions of the present invention is how to test medical data quickly in a standardized way.

To resolve the foregoing technical problem, the technical solutions according to the present invention provide a method for testing medical data, the medical data comprising a plurality of information units and a plurality of separators, and the method comprises the following steps:

a. matching a medical datum against a standard library comprising a plurality of patterns, a matching expression being: [\s\S][number/sequence/relation]&[\b|\B], wherein [ ] represents a matching procedure, \s represents a similarity between a non-initial boundary of the medical datum and a non-initial boundary of the standard library, \S represents a similarity between an initial boundary of the medical datum and an initial boundary of the standard library, "number" represents a similarity between a quantity of information units comprised in the medical datum and a quantity of patterns comprised in the standard library, "sequence" represents a similarity between a sequence of the plurality of information units and a sequence of the plurality of patterns, "relation" represents a similarity between semantic relationships among the plurality of information units and semantic relationships among the plurality of patterns, & represents implementation of one or more matching procedures, \b represents a similarity between a character boundary of the medical datum and a character boundary of the standard library, \B represents a similarity between a non-character boundary of the medical datum and a non-character boundary of the standard library, | represents alternative matching, and / represents simultaneous matching; and b. determining, based on a matching result of the step a, whether the medical datum is qualified.

Preferably, each information unit has a value domain limitation, the value domain limitation is set according to a category of the information unit, and when the step a is performed, word segmentation is not performed on the medical datum.

Preferably, in the matching expression of the step a, \S is given by $$\backslash s = \frac{\sum_{i=1}^{n_1}(s_i - s_i')^2}{\sum_{i=1}^{n_1} s_i^2},$$

where n1 represents a quantity of non-initial boundaries of the medical datum, si represents a farthest distance between two non-initial boundaries of the medical datum, and s'i represents a distance from a non-initial boundary of the medical datum to a non-initial boundary of the standard library.

Preferably, in the matching expression of the step a, \S is given by $$\backslash S = \frac{\sum_{i=1}^{n_1}(S_i - S_i')^2}{\sum_{i=1}^{n_1} S_i^2},$$

where n2 represents a quantity of initial boundaries of the medical datum, Si represents a farthest distance between two initial boundaries of the medical datum, and S'i represents a distance from an initial boundary of the medical datum to an initial boundary of the standard library.

Preferably, in the matching expression of the step a, $$number = \begin{cases} 0, & Num_a \neq Num_b \\ 1, & Num_a = Num_b \end{cases},$$

where Numa represents a quantity of information units comprised in the medical datum, and Numb represents a quantity of patterns comprised in the standard library.

Preferably, in the matching expression of the step a, $$Sequence = \frac{\sum_{i=1}^{n_3}(Seq_i - Seq'_i)^2}{\sum_{i=1}^{n_3} Seq_i^2},$$

wherein n3=Numa−1, Numa represents a quantity of information units comprised in the medical datum, Seqi represents a distance between two adjacent information units, and Seq'i represents a distance between two adjacent patterns.

Preferably, in the matching expression of the step a, $$Relation = \begin{cases} 0, & Rel_a \neq Rel_b \\ 1, & Rel_a = Rel_b \end{cases},$$

where Rela represents a quantity of semantic relationships comprised in the plurality of information units, and Relb represents a quantity of semantic relationships comprised in the plurality of patterns.

Preferably, in the matching expression of the step a, $$\backslash s = \frac{\sum_{i=1}^{n_4}(b_i - b'_i)^2}{\sum_{i=1}^{n_4} b_i^2},$$

where n4 represents a quantity of character boundaries of the medical datum, bi represents a farthest distance between two character boundaries of the medical datum, and b'i represents a distance from a character boundary of the medical datum to a character boundary of the standard library.

Preferably, in the matching expression of the step a, $$\backslash B = \frac{\sum_{i=1}^{n_5}(B_i - B'_i)^2}{\sum_{i=1}^{n_5} B_i^2},$$

where n5 represents a quantity of non-character boundaries of the medical datum, Bi represents a farthest distance between two non-character boundaries of the medical datum, and B'i represents a distance from a non-character boundary of the medical datum to a non-character boundary of the standard library.

Preferably, the step b comprises the following steps:

b1: calculating a similarity between the medical datum and the standard library by using the following formula, where C represents the similarity between the medical datum and the standard library, cj represents a similarity of each matching procedure in the step a, and m represents a quantity of matching procedures in the step a, $$C = \begin{cases} \min_{j=1}^{m}\{1 - c_j\}, & m \neq 0 \\ 0, & m = 0 \end{cases};$$

b2: if C≤Cmin, determining that the medical data is qualified, where Cmin represents a preset minimum similarity threshold.

In the present invention, a standardized standard library is first established, a matching result is obtained by matching the medical datum against the standard library for a non-initial boundary, an initial boundary, an information quantity, information sequences, a semantic relationship quantity, a character boundary, and a non-character boundary, and whether the medical datum meets a requirement is further determined according to the matching result.

BRIEF DESCRIPTION OF THE DRAWINGS

Other features, objectives, and advantages consistent with the present invention will become more obvious by reading the detailed description of non-limitative embodiments that is provided with reference to the following accompanying drawings.

DETAILED DESCRIPTION

Figure 1:
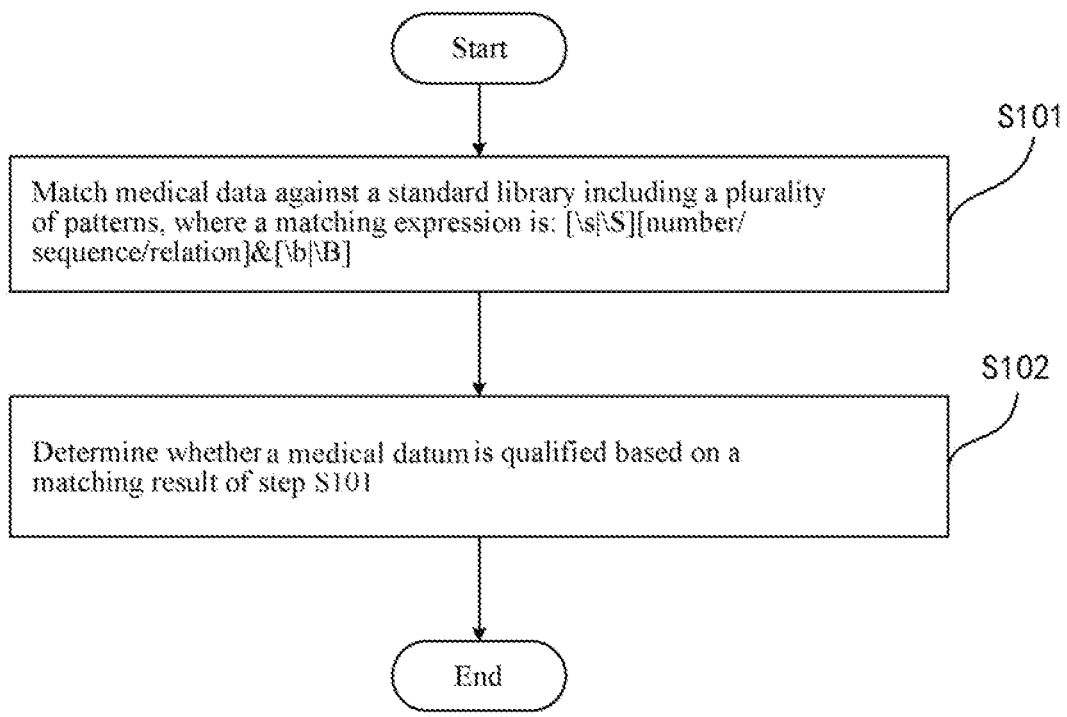
FIG. 1 is a flowchart illustrating a method for testing medical data according to a specific implementation consistent with the present invention.
Figure 2:
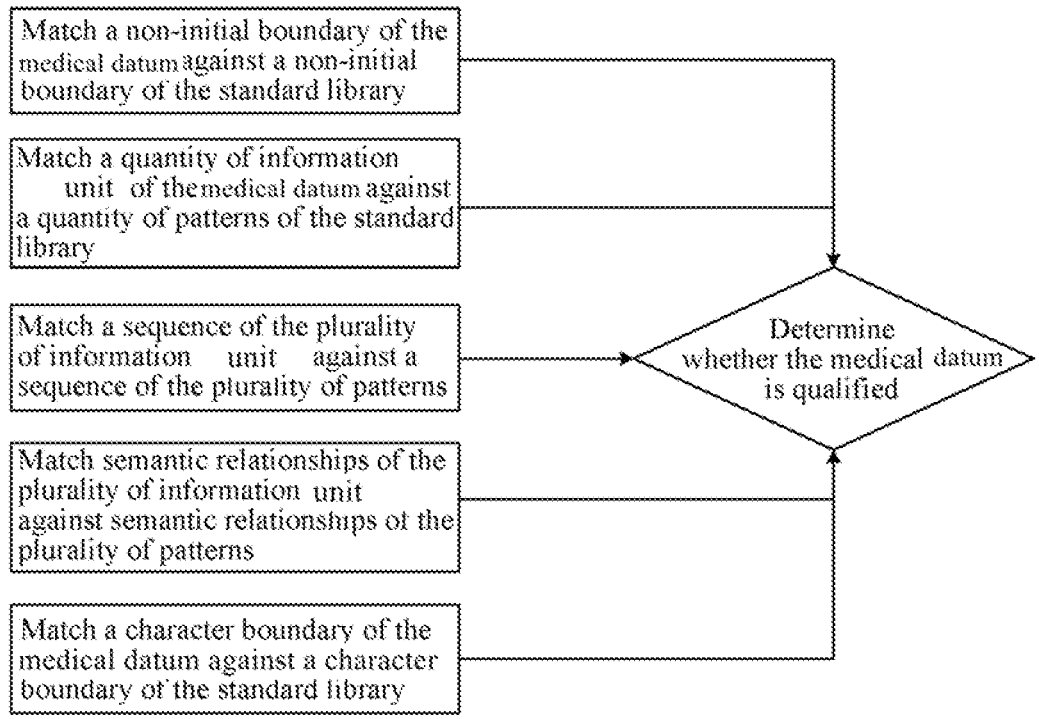
FIG. 2 is a schematic diagram showing a plurality of different matching procedures according to an embodiment of the present invention.
Figure 3:
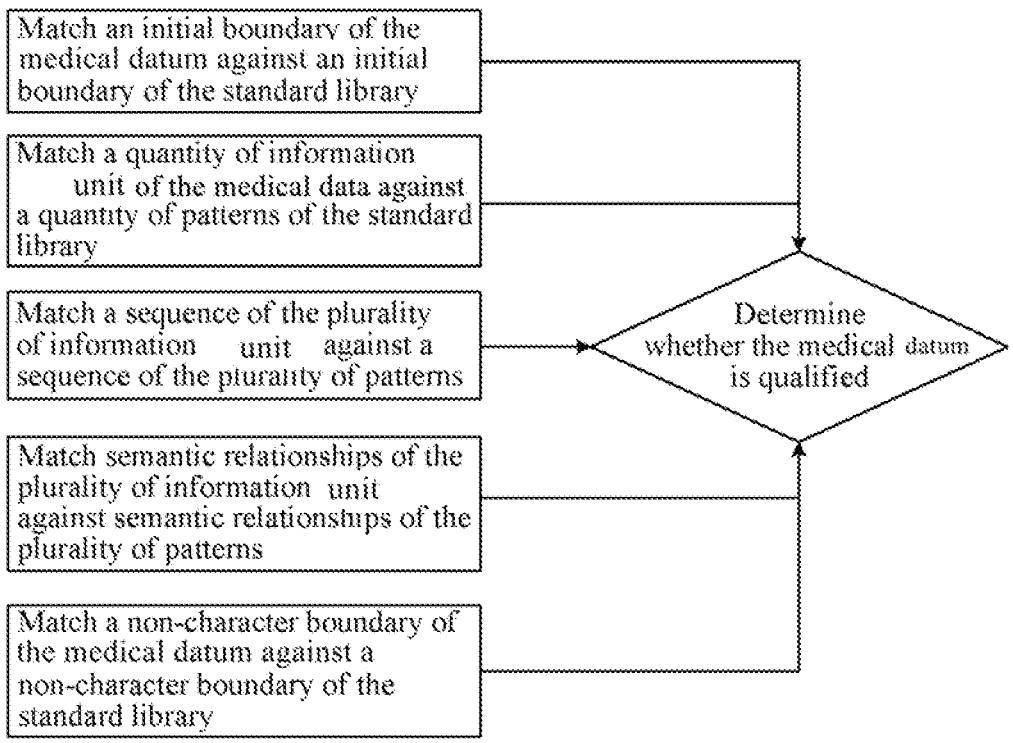
FIG. 3 is a schematic diagram showing a plurality of different matching procedures according to an embodiment of the present invention.
Figure 4:
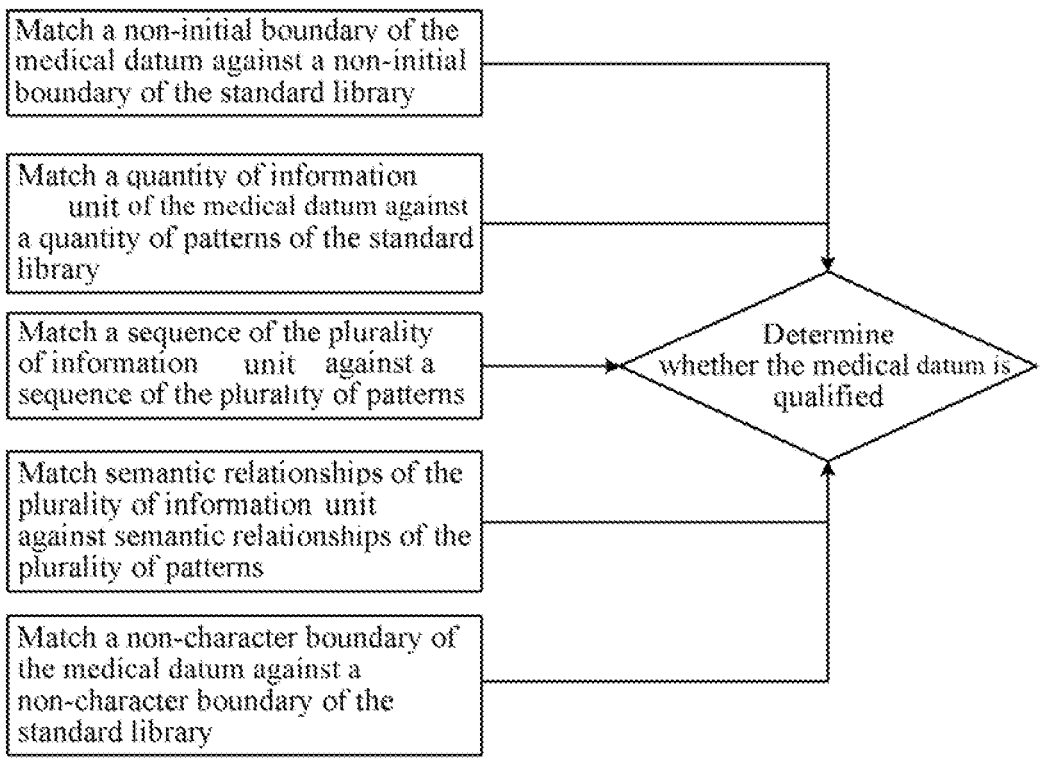
FIG. 4 is a schematic diagram showing a plurality of different matching procedures according to an embodiment of the present invention.
Figure 5:
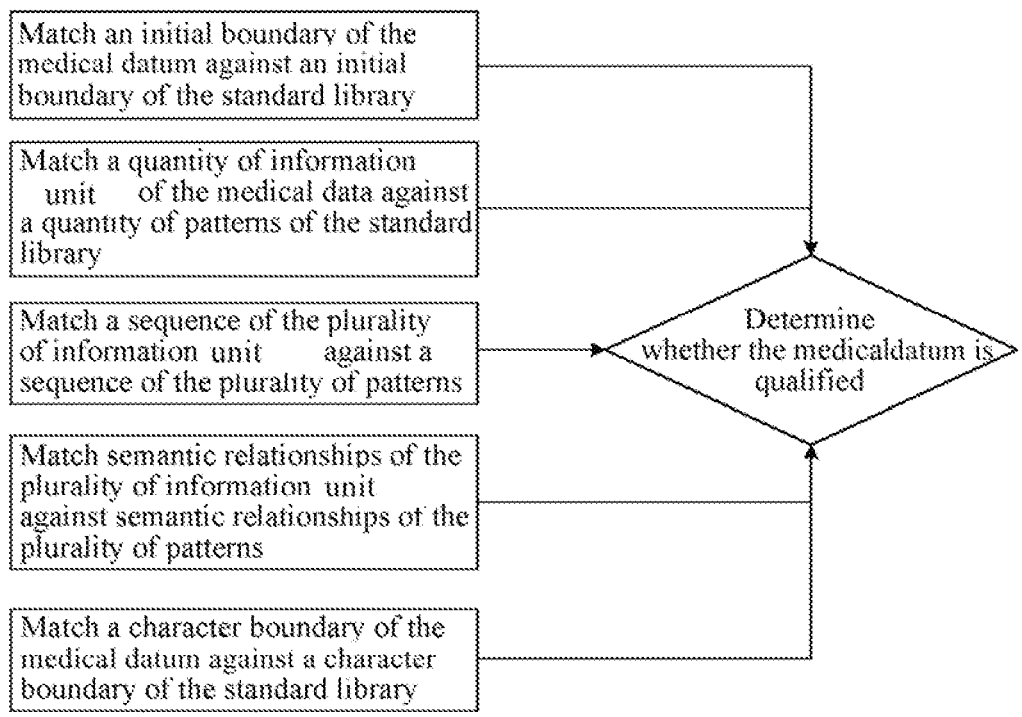
FIG. 5 is a schematic diagram showing a plurality of different matching procedures according to an embodiment of the present invention.

To present the technical solutions consistent with the present invention more clearly, the following further describes the present invention with reference to the accompanying drawings.

A person skilled in the art understands that medical data generally comes from a user terminal, and the user terminal may be understood as a terminal device, which can collect data through manual inputting or being connected to different detection devices. For example, the user terminal may be a mobile phone or a tablet computer into which data is recorded through manual inputting or photographing with automatic recognition. In another example, the user terminal may be a computer sharing data with a medical sensor or a medical detection apparatus, to collect data in real time through open ports. More specifically, basic medical data are data associated with individuals, which may be understood from different angles: in terms of generation channels of medical data, the basic medical data may be mainly divided into doctor-end data and patient-end data, where the doctor-end data comprise outpatient and emergency records, hospitalization records, video records, laboratory records, medicine-using records, operation records, and follow-up records, and the patient-end data comprise personal habits, a living environment, family heredity, and a family environment. In terms of components of the basic medical data, the basic medical data may be divided into: (1) measurement values generated through medical examinations, such as body temperature, blood pressure, oxygen saturation, and laboratory values; (2) signals recorded by instruments, such as electrocardiograms and electroencephalograms; (3) images generated by medical imaging devices such as X-ray images, CT images, and MRI images; (4) reporting results presented in the form of text, such as explanations of measurement values, signals, and images provided by a doctor according to his/her medical knowledge, and pathological diagnosis made by a doctor; (5) narrative data, such as complaints recorded by a doctor (a state of illness dictated by a patient) and medical records of a patient; (6) metadata text, such as knowledge about organs, medicines, diseases, and therapies, and parameters of medical devices; and (7) social characteristics, such as institution information of a hospital, and personal information of doctors and patients. Although these different types of basic medical data have different structures and contain different semantics, the data can complement each other and express content and features of medical information from different specific angles, thereby forming a diversified and complementary data set.

Further, in the present invention, content of the medical data does not require coherence in linguistic logic, and the medical data are recorded in a modularized manner by using separators. That is, content of each module corresponds to content of each piece of medical data, but a plurality of information units should have a medical semantic relationship in-between. In light of current situation of historical medical records of hospitals, such data are usually the most ubiquitous in a hospital information system (HIS), and obtaining them is relatively easy. Certainly, in recent years, the National Health management department of China are promoting standardized electronic medical records throughout the country, data of these standardized electronic medical records are therefore already quite structured and are not the type of data on which the present invention focuses. More specifically, a test object, namely, medical data consistent with the present invention comprises the following features:

1) the data may be divided into a plurality of structures (medical data), wherein functions of the structures support each other, and the structures are discrete modules with independent content;
2) each medical datum comprises clear semantic information, and content thereof is a plurality of medical phrases;
3) each medical datum is separated from other medical data by using separators, where a common separator may be a punctuation mark; preferably, the separator may not be a punctuation mark and is instead a carriage return, a space, a serial number sequence, or a special character; and
4) contents of each medical datum are subject to value domain limitations, where each value domain limitation is set according to a category of a corresponding information unit, namely, contents of the medical data are dependent variables, and the categories of the information units are independent variables. Specifically, the categories of the information units may be construed as a tag set for the medical datum. For example, tags of a medical datum is set as "neurology", "epilepsy", and "symptom", and correspondingly, the contents of the medical datum are a set of medical symptoms corresponding to the epilepsy disease in neurology. That is, value domains of the contents of the medical datum are limited within the foregoing range. A person skilled in the art understands that obtaining the tags of the medical datum is very easy, and a corresponding department and corresponding doctor may be located quite easily according to a historical medical record, without additional preprocessing using a complex algorithm. In another example, the tags of the medical datum are set as "neurology", "epilepsy", and "medicine", and correspondingly, the contents of the medical datum are a set of clinical medicines corresponding to the epilepsy disease in neurology.

Further, in combination with the foregoing features, before the medical data are tested, word segmentation does not need to be performed on the medical data. Specifically, the medical data generally comprise two expression forms, a text form and a Web document form, where the text form is a quite common form, and the Web document form is formed by splitting the medical data into units and loading the units into Web. In existing technologies, before the medical data are processed, corresponding medical dictionaries generally need to be invoked and word segmentation needs to be performed on the medical data, and a common method is to construct text vectors for the features by using the corresponding medical dictionaries, where the quantity of text vectors formed in this way is huge, and the corresponding calculation amount is relatively large. In existing technical improvement solutions, to reduce dimensions of the text vectors, the text vectors need to be constructed by using fewer medical dictionaries. As a result, the degree of association between the medical dictionary needs to be improved, for which sorting based on importance usually needs to be introduced, which in turn necessitates a more complex word segmentation algorithm and results in unstable accuracy, although the efficiency is improved. In the present invention, the contents of each medical datum are short and clear and are all from clinical doctors, so that the contents do not comprise redundant modifying components. In combination with an actual application situation, the step of word segmentation on the medical data may be totally omitted to improve the efficiency. Such solution hasn't been applied in any prior art.

FIG. 1 is a flowchart illustrating a method for testing medical data according to a specific implementation consistent with the present invention, and the method comprises the following steps:

Step S101 of matching a medical datum against a standard library comprising a plurality of patterns is first performed, wherein a matching expression for the matching is: [\s|\S][number/sequence/relation]&[\b|\B]. Specifically, [ ] represents a matching procedure, \s represents a similarity between a non-initial boundary of the medical datum and a non-initial boundary of the standard library, \S represents a similarity between an initial boundary of the medical datum and an initial boundary of the standard library, "number" represents a similarity between a quantity of information units comprised in the medical datum and a quantity of patterns comprised in the standard library, "sequence" represents a similarity between a sequence of the plurality of information units and a sequence of the plurality of patterns, "relation" represents a similarity between semantic relationships among the plurality of information units and semantic relationships among the plurality of patterns, & represents implementation of one or more matching procedures, \b represents a similarity between a character boundary of the medical datum and a character boundary of the standard library, \B represents a similarity between a non-character boundary of the medical datum and a non-character boundary of the standard library, | represents alternative matching, and / represents simultaneous matching.

Further, in combination with the matching expression, [\s|\S] represents matching similarity between a non-initial boundary of the medical datum and a non-initial boundary of the standard library or matching a similarity between an initial boundary of the medical datum and an initial boundary of the standard library provided that one of the two matching procedures is performed. [number/sequence/relation] represents: matching a similarity of a quantity of information units comprised in the medical datum and a quantity of patterns comprised in the standard library, matching a similarity between a sequence of the plurality of information units and a sequence of the plurality of patterns, or matching a similarity between semantic relationships among the plurality of information units and semantic relationships among the plurality of patterns provided that one of the three matching procedures is performed. [\b|\B] represents matching a similarity between a character boundary of the medical datum and a character boundary of the standard library or matching a similarity between a non-character boundary of the medical datum and a non-character boundary of the standard library provided that one of the two matching procedures is performed.

Still further, with reference to FIG. 2 to FIG. 5, [\s|\S], [number/sequence/relation], and [\b|\B] may be performed sequentially, or any procedure may be randomly started not according to the sequence, but each procedure needs to be performed. In addition, the matching a similarity between a character boundary of the medical datum and a character boundary of the standard library or the matching a similarity between a non-character boundary of the medical datum and a non-character boundary of the standard library may be performed for a plurality of times.

A person skilled in the art understands that the present invention limits a matching range of the medical data and the standard library, and specifically completes the matching by using a binary matching method, wherein one is to match structures of the medical datum and the standard library, comprising a quantity of the information units, a quantity of the patterns, a sequence of the plurality of information units, a sequence of the plurality of patterns, a quantity of semantic relationships among the plurality of information units, and a quantity of semantic relationships among the plurality of patterns; and the other is to match the medical datum against the standard library. Specifically, the matching between the standard library and the medical datum focuses on a structure, namely, focuses on a non-initial boundary, an initial boundary, a character boundary, and a non-character boundary, and content of the standard library and content of the medical data are not key points of the matching. More specifically, the quantities of semantic relationships need to be matched, so that semantic recognition of corresponding phrases forming the character boundaries and non-character boundaries of the medical datum and the standard library is necessary.

Then, step S102 of determining, based on a matching result of step S101, whether the medical data are qualified is performed. A person skilled in the art understands that step S101 matches a similarity between the medical data and the standard library. Specifically, there is a plurality of algorithms for calculating the similarity, such as a Euclidean distance method which obtains the similarity by determine natural lengths of the medical datum and the standard library, or a Pearson correlation coefficient method which obtains the similarity by dividing covariance by a standard deviation of the medical datum and the standard library, or a cosine distance method which obtains the similarity by calculating a cosine value of an angle of the medical datum and the standard library. Preferably, the principle of determining the similarity between the medical data and the standard library by using the cosine distance method lies in that the cosine distance method is not sensitive to values and depends more on the consistency or difference in directions of the medical datum and the standard library. That is, determining the similarity between the medical datum and the standard library by using the cosine distance method is mainly performed in the same field, which is more suitable for the determination.

Further, the matching result obtained through step S101 is an absolute value, and determining whether the medical datum is qualified depends on a standard that needs to be set in step S102. For example, a threshold may be set, and the matching result obtained through step S101 is compared with the threshold to determine whether the medical datum is qualified. In another example, determination may be further performed according to a right or wrong standard, namely, in the procedures of the matching expression of step S101, the medical datum can be only determined as qualified when the matching is consistent. A person skilled in the art understands that the matching in the present invention does not involve matching of specific contents, and each matching procedure is an absolute matching method relating to tendency or quantity, which is more suitable for the latter determination method.

Still further, the plurality of matching procedures in step S101 may generate a plurality of matching results. Correspondingly, in step S102, it may be configured that the medical data can be only determined as qualified after all the matching procedures succeed, and as a variation, it may be alternatively configured that the medical datum may be determined as qualified after a part of the matching procedures succeeds. As another variation, a comprehensive matching value may be alternatively obtained by calculating the plurality of matching results, to further determine whether the medical datum are qualified by comparing the matching value with the set threshold. A person skilled in the art may obtain more embodiments through variations on this basis, and details are not described herein.

The following lists a simpler embodiment for ease of understanding.

The medical datum is expressed as, for example, "20190321~gastroenterology~fever and abdominal pain~an increase in white blood cells and an increase in neutrophils-appendicitis", and corresponding definitions are as follows: ~ is a separator, an information unit is a phrase between two separators, each separator is a non-initial boundary. In this way, the quantity of information units is 4, an initial boundary is "20190321", and correspondingly, the standard library is defined as "non-Chinese character" "separator" "discipline standard library" "separator" "symptom standard library" "separator", "indicator standard library" "separator" "disease standard library". Based on this, a variable embodiment according to the matching expression of step S101 is as follows:

For example, when matching initial boundaries, a plurality of forms may be generated through variation according to a feature of the initial boundary of the standard library. Taking the foregoing standard library as an example, if the initial boundary of the medical datum is numbers that are all non-Chinese characters, the matching succeeds; and in another example, when matching initial boundaries, if discipline information follows the initial boundary of the medical datum, and the matching succeeds in this case. In another example, when matching initial boundaries, if first Chinese character information after the initial boundary of the medical datum is discipline information, the matching succeeds in this case. In another example, when matching initial boundaries, if first information unit after the initial boundary of the medical datum starts with a Chinese character, the matching fails in this case. In another example, a similarity between the non-Chinese character comprised in the initial boundary of the medical data and a non-Chinese sub-character comprised in a pattern are to be matched; taking the foregoing time as an example, the "non-Chinese character" of the standard library may be directly defined as a specific time "20190531", to directly select medical data whose time is relatively close to the specific time. A person skilled in the art understands that a plurality of determination methods may be defined on this basis, and details are not described herein.

For example, when matching non-initial boundaries, if the quantity of non-initial boundaries of the medical datum and the quantity of non-initial boundaries of the standard library are equal, the matching succeeds. In another example, when matching non-initial boundaries, semantic tags of first characters before and after each non-initial boundary of the medical data are determined, tags of two patterns connected to each non-initial boundary of the standard library are determined, and if attributes of the two sets of tags are consistent and corresponding to each other, the matching succeeds. In another example, when matching non-initial boundaries, the quantity of characters of two adjacent non-initial boundaries of the medical datum and the quantity of characters of two adjacent non-initial boundaries of the standard library are determined, and the matching succeeds if the two quantities are equal. A person skilled in the art understands that a plurality of determination methods may be defined on this basis, and details are not described herein.

For example, when matching the quantity of information units and the quantity of patterns, and the matching succeeds if the two quantities are equal. Specifically, a key factor affecting the result of this matching procedure is how information units and patterns are defined. Taking the medical datum as an example, the corresponding definition is that "a phrase between two separators is an information unit"; if the definition is changed and an information unit is defined according to logic of medical word segmentation, "fever and abdominal pain" will be two information units by definition rather than one information unit. More specifically, defining of the information units of the medical datum is proactively performed, division of the information units of the medical datum is reactively performed, and division needs to be performed according to a set definition of the information units. In comparison, defining of the patterns is also proactively performed, and the patterns may be understood as a standardized information library, so that the step of reactive recognition is omitted unlike the recognition of the information units, and therefore definition manners of variable embodiments thereof are more diversified. However, the degree of complexity of the definition of the patterns decides the success rate of matching. A person skilled in the art understands that a plurality of determination methods may be defined on this basis, and details are not described herein.

For example, when matching sequences, it is first determined whether a sequence of tag types to which the plurality of information units belong is consistent with a sequence of the plurality of patterns. Taking the foregoing medical datum as an example, the information units are sorted according to time, department, symptom, indicator, or diagnosis. A specific recognition manner may be that: semantic analysis is first performed on the plurality of information units to obtain a rough result, the plurality of information units are then tagged according to a tag library classification standard, and sorting is then performed according to the tagged information units. The plurality of patterns is in a standardized sequence generated according to the tag library classification standard, so that a step of semantic analysis does not need to be performed. During actual application, with different norms of the medical data, an increase in the quantity of information units, and an increase in the quantity of patterns, sequence matching will also be complex. As a variation, the similarity between the sequence of the plurality of information units and the sequence of the plurality of patterns may be evaluated. For example, some medical data mix symptoms and indicators, in view of the word segmentation step omitted in the present invention, provided that an information unit obtained by performed semantic analysis on the information unit mixes symptom information and indicator information, the sequence of this information unit may be considered to be similar to that of "symptom pattern-indicator pattern", and the matching succeeds. A person skilled in the art understands that a plurality of determination methods may be defined on this basis, and details are not described herein.

For example, for the information units, semantic analysis may be performed on each information unit, and according to semantic analysis results, every jump may be considered as a semantic relationship. In this way, a quantity of semantic relationships among the plurality of information units is obtained, wherein the jump refers to every time the information unit switch a dictionary type based on the semantic analysis. More specifically, for the plurality of patterns, a simple method is that the quantity of semantic relationships may be set to be equal to the quantity of patterns. That is, the definition of the quantity of patterns directly impacts the quantity of semantic relationships among the plurality of patterns. A person skilled in the art understands that when the quantity of semantic relationships among the plurality of information units and the quantity of semantic relationships among the plurality of patterns are matched, if the two quantities are equal or close to each other, the matching may be considered as a success.

For example, when matching character boundaries, for the medical datum, the character boundaries are actually position identifiers determining the first character and the last character of each information unit, and the corresponding definition is the same for the standard library. Correspondingly, according to a feature of the character boundary of the standard library, a plurality of alternative definitions may be generated through variation. Taking the foregoing standard library as an example, the latter character boundary of the first information unit of the medical datum has a separator and the former character boundary does not have a separator, and a quantity of Chinese characters between the two character boundaries is 4. Correspondingly, the first information unit is matched against the first pattern of the standard library, if a position of the separator of the first information unit is the same as a position of a separator of the first pattern, and the quantity of Chinese characters between the two character boundaries of the first information unit is also the same as or similar to that of the first pattern, the matching may be considered as a success. More specifically, there may be a plurality of types of matching for a similarity of the quantity of Chinese characters between two character boundaries, where one case is that, if the quantity of Chinese characters of the first information unit does not exceed an upper limit of the quantity of Chinese characters defined by the first pattern, the matching may be considered as a success; and another case is that the quantity of Chinese characters of the first information unit may exceed the upper limit, but Chinese character information of the first information unit should be a subset of that of the first pattern. A person skilled in the art understands that a plurality of determination methods may be defined on this basis, and details are not described herein.

For example, when matching non-character boundaries, in combination with the description of matching character boundaries, all boundaries other than the character boundaries are non-character boundaries. For this embodiment, position identifiers of each Chinese character are all non-character boundaries, namely, a set formed by non-character boundaries express position information of all Chinese characters comprised in the medical datum, and correspondingly, definition of non-character boundaries of the standard library is the same. On this basis, matching of non-character boundaries does not involve matching of specific semantics, which matches position information of each character of the medical datum against position information of each character of the standard library, namely, the matching is based on structure consistency or structure similarity between the medical datum and the standard library. In terms of actual application, this matching procedure is used for measuring the simplification of the medical datum and measuring whether the medical datum belongs to excessively redundant daybook text. A person skilled in the art understands that a plurality of determination methods may be defined on this basis, and details are not described herein.

Based on the foregoing descriptions, the following lists a plurality of specific embodiments for each matching procedure:

As a first embodiment consistent with the present invention, in the procedure of matching non-initial boundaries, $$\backslash s = \frac{\sum_{i=1}^{n_1}(s_i - s_i')^2}{\sum_{i=1}^{n_1} s_i^2},$$

where n1 represents a quantity of non-initial boundaries of the medical datum, si represents a farthest distance between two non-initial boundaries of the medical datum, and s'i represents a distance from a non-initial boundary of the medical datum to a non-initial boundary of the standard library. Specifically, in this embodiment, matching is performed by using the quantity of non-initial boundaries of the medical datum as a standard, that is, if the quantity of non-initial boundaries of the standard library is greater than that of the medical datum, implementation of this embodiment will not be affected. More specifically, in this embodiment, calculation may be performed by using the cosine distance method described in step S102. Taking i=1 as an example, s1 represents a cosine distance between a first non-initial boundary of the medical datum and another non-initial boundary with the lowest similarity with the first non-initial boundary of the medical datum, and s'1 represents a similarity between the first non-initial boundary of the medical datum and a first non-initial boundary of the standard library, where the non-initial boundary actually is a plurality of position identifiers. In this way, this embodiment actually calculates a position similarity between the non-initial boundary of the medical datum and the non-initial boundary of the standard library.

As a second embodiment consistent with the present invention, in the procedure of matching initial boundaries, $$\backslash S = \frac{\sum_{i=1}^{n_2}(S_i - S_i')^2}{\sum_{i=1}^{n_2} S_i^2},$$

where n2 represents a quantity of initial boundaries of the medical datum, Si represents a farthest distance between two initial boundaries of the medical datum, and S'i represents a distance from an initial boundary of the medical datum to an initial boundary of the standard library. Specifically, in this embodiment, matching is performed by using the quantity of initial boundaries of the medical datum as a standard, that is, if the quantity of initial boundaries of the standard library is greater than that of the medical datum, implementation of this embodiment will not be affected. More specifically, in this embodiment, calculation may be performed by using the cosine distance method described in step S102. Taking i=1 as an example, S1 represents a cosine distance between a first initial boundary of the medical data and another initial boundary with the lowest similarity with the first initial boundary of the medical datum. Using an example in which the medical data are expressed as "20190321~gastroenterology~fever and abdominal pain~an increase in white blood cells and an increase in neutrophils~appendicitis" as an example, 20190321 are all initial boundaries, and the first initial boundary is a position identifier of "2", and the initial boundary with a farthest distance to the first initial boundary is the last "1", and a cosine distance therebetween is S1. Similarly, S'i is a similarity between the first initial boundary of the medical datum and a first initial boundary of the standard library, which is expressed as a cosine distance. A person skilled in the art understands that the initial boundary actually is a position identifier. In this way, this embodiment actually calculates a position similarity between the initial boundary of the medical datum and the initial boundary of the standard library.

As a third embodiment consistent with the present invention, $$\text{number} = \begin{cases} 0, & Num_a \neq Num_b \\ 1, & Num_a = Num_b \end{cases},$$

where Numa represents a quantity of information units comprised in the medical datum, and Numb represents a quantity of patterns comprised in the standard library. A person skilled in the art understands that this embodiment matches absolute quantities, and there are only two matching results: 0 or 1. In combination with the foregoing content, a key point affecting the matching result of this embodiment is the definition of the separators of the medical datum.

As a fourth embodiment consistent with the present invention, $$\text{Sequence} = \frac{\sum_{i=1}^{n_3}(Seq_i - Seq'_i)^2}{\sum_{i=1}^{n_3} Seq_i^2},$$

where n3=Numa−1, Numa represents a quantity of information units comprised in the medical datum, Seqi represents a distance between two adjacent information units, and Seq'i represents a distance between two adjacent patterns. Specifically, the distance between two information units actually is a similarity between the two information units, and the distance between two patterns actually is a similarity between the two patterns. Correspondingly, in the matching procedure of this embodiment, specific contents of the information units or semantic analysis on contents of the patterns are still not involved, and only tendencies is determined. In this way, technical difficulty may be reduced and matching efficiency may be improved. Preferably, Seqi and Seq'i correspond to each other. For example, if i=1, the two respectively indicates a distance between a first information unit and a second information unit and a distance between a first corresponding pattern and a second corresponding pattern. More specifically, in this embodiment, matching is performed by using the quantity of information units of the medical data as a standard, that is, if the quantity of patterns of the standard library is greater than the quantity of the information units, implementation of this embodiment is not affected.

As a fifth embodiment consistent with the present invention, $$\text{Relation} = \begin{cases} 0, & Rel_a \neq Rel_b \\ 1, & Rel_a = Rel_b \end{cases},$$

where Rela represents a quantity of semantic relationships comprised in the plurality of information units, and Relb represents a quantity of semantic relationships comprised in the plurality of patterns. Specifically, the matching manner of this embodiment is close to the matching manner of the third embodiment, and one difference lies in that the quantities of semantic relationships are matched in this embodiment. As described above, semantic analysis may be performed on each information unit, and according to semantic analysis results, every jump may be considered as a semantic relationship. In this way, a quantity of semantic relationships among the plurality of information units is obtained, where the jump refers to every time the information unit switch a dictionary type based on the semantic analysis. More specifically, for the plurality of patterns, the quantity of semantic relationships may also be simply set to be equal to the quantity of patterns. That is, definition of the quantity of patterns directly impacts the quantity of semantic relationships among the plurality of patterns.

As a sixth embodiment consistent with the present invention, $$\backslash s = \frac{\sum_{i=1}^{n_4}(b_i - b'_i)^2}{\sum_{i=1}^{n_4} b_i^2},$$

where n4 represents a quantity of character boundaries of the medical datum, bi represents a farthest distance between two character boundaries of the medical datum, and b'i represents a distance from a character boundary of the medical datum to a character boundary of the standard library. Specifically, in this embodiment, matching is performed by using the quantity of character boundaries of the medical datum as a standard, that is, if the quantity of character boundaries of the standard library is greater than that of the medical datum, implementation of this embodiment is not affected. More specifically, in this embodiment, calculation may be performed by using the cosine distance method described in step S102. Using i=1 as an example, s1 represents a cosine distance between a first character boundary of the medical datum and another character boundary with the lowest similarity with the first character boundary of the medical datum, and s'1 represents a similarity between the first character boundary of the medical datum and a first character boundary of the standard library, where the character boundary actually is a plurality of position identifiers. In this way, this embodiment actually calculates a position similarity between the character boundaries of the medical datum and the character boundaries of the standard library.

As a seventh embodiment consistent with the present invention, $$\backslash B = \frac{\sum_{i=1}^{n_5}(B_i - B'_i)^2}{\sum_{i=1}^{n_5} B_i^2},$$

where n5 represents a quantity of non-character boundaries of the medical datum, Bi represents a farthest distance between two non-character boundaries of the medical datum, and B'i represents a distance from a non-character boundary of the medical datum to a non-character boundary of the standard library. Specifically, in this embodiment, matching is performed by using the quantity of non-character boundaries of the medical datum as a standard, that is, if the quantity of non-character boundaries of the standard library is greater than that of the medical datum, implementation of this embodiment is not affected. More specifically, in this embodiment, calculation may be performed by using the cosine distance method described in step S102. Taking i=1 as an example, s1 represents a cosine distance between a first non-character boundary of the medical datum and another non-character boundary with the lowest similarity with the first non-character boundary of the medical datum, and s'1 represents a similarity between the first non-character boundary of the medical datum and a first non-character boundary of the standard library, where the non-character boundary actually is a plurality of position identifiers. In this way, this embodiment actually calculates a position similarity between the non-character boundaries of the medical data and the non-character boundaries of the standard library.

Figure 6:
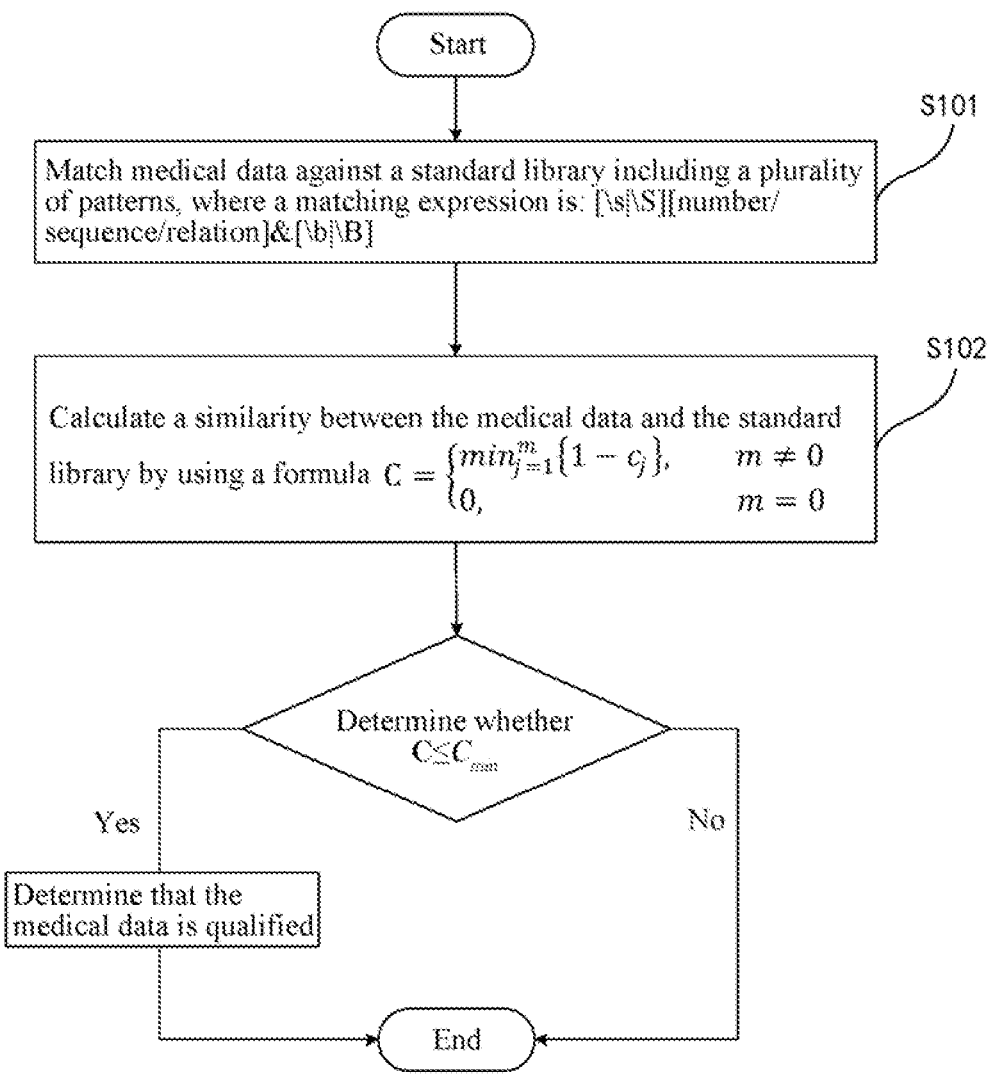
FIG. 6 is a flowchart illustrating a method for testing medical data according to another specific implementation consistent with the present invention.

FIG. 6 shows a method for testing medical data according to another specific implementation consistent with the present invention, and the method comprises the following steps:

Step S201 of matching a medical datum against a standard library comprising a plurality of patterns is first performed, where a matching expression is: [\s|\S][number/sequence/relation]&[\b|\B]. Specifically, this step may be understood with reference to step S101, and details are not described herein again.

Further, step S202 is performed, which includes calculating a similarity between the medical datum and the standard library by using the following formula, where C represents the similarity between the medical datum and the standard library, cj represents a similarity of each matching procedure in the step S201, and m represents a quantity of matching procedures in the step S201, $$C = \begin{cases} \min_{j=1}^{m}\{1 - c_j\}, & m \neq 0 \\ 0, & m = 0 \end{cases}.$$

Specifically, the foregoing embodiment 1 to embodiment 7 list each matching procedure in the step S201, and a person skilled in the art may understand these procedures in combination with the matching expression in the step S201. C is a final calculation result of the matching expression in the step S201, that is, in combination with the formula shown in this step, when no matching procedure is performed, m=0, and correspondingly, the calculation result of the matching expression is also 0, namely, C=0. In this case, the similarity between the medical data and the standard library is 0. However, with the progress of the matching procedures, values of m are sequentially 1, 2, 3, and 4, and the calculation result cj of each corresponding matching procedure is expressed as a specific value, and after all the matching procedures are completed, the minimum of a number of cj (the number is m) is used as the calculation result of the matching expression.

Further, step S203 of determining whether C is less than or equal to Cmin is performed, where Cmin represents a preset minimum similarity threshold. If C≤Cmin, step S204 of determining whether the medical datum is qualified is performed. Specifically, as can be known from a result of the step S202, a matching procedure result with the lowest similarity with the standard library is selected in the step S202, and an objective of this step is to calculate whether the matching procedure with the lowest similarity still falls within a lowest threshold range set by a system, namely, whether the result is less than or equal to Cmin. More specifically, if the matching procedure with the lowest similarity is still acceptable, the medical datum may be determined as qualified.

Specific embodiments consistent with the present invention are described above. It should be understood that the present invention is not limited to the specific embodiments described above, and a person skilled in the art may make various changes or modifications within the scope of the claims without departing from the spirit of the present invention.

What is claimed is:

1. A method for testing medical data, wherein a medical datum to be tested comprises a plurality of information units and a plurality of separators, and the method comprises the following steps:

a. matching the medical datum against a standard library comprising a plurality of patterns, a matching expression being: [\s\S][number/sequence/relation]&[\b|\B], wherein [ ] represents a matching procedure, \s represents a similarity between a non-initial boundary of the medical datum and a non-initial boundary of the standard library, \S represents a similarity between an initial boundary of the medical datum and an initial boundary of the standard library, "number" represents a similarity between a quantity of information units comprised in the medical data and a quantity of patterns comprised in the standard library, "sequence" represents a similarity between a sequence of the plurality of information units and a sequence of the plurality of patterns, "relation" represents a similarity between a quantity of semantic relationships among the plurality of information units and a quantity of semantic relationships among the plurality of patterns, & represents implementation of one or more matching procedures, \b represents a similarity between a character boundary of the medical datum and a character boundary of the standard library, \B represents a similarity between a non-character boundary of the medical datum and a non-character boundary of the standard library, | represents alternative matching, and / represents simultaneous matching; and b. determining, based on a matching result of step a, whether the medical datum is qualified.

2. The method for testing medical data as in claim 1, wherein the information unit has a value domain limitation, the value domain limitation is set according to a category of the information unit, and when the step a is performed, word segmentation is not performed on the medical data.

3. The method for testing medical data as in claim 1, wherein in the matching expression of step a, $$\backslash s = \frac{\sum_{i=1}^{n_1}(s_i - s'_i)^2}{\sum_{i=1}^{n_1} s_i^2},$$

wherein $n_1$ represents a quantity of non-initial boundaries of the medical datum, $s_i$ represents a farthest distance between two non-initial boundaries of the medical datum, and $s'_i$ represents a distance from a non-initial boundary of the medical datum to a non-initial boundary of the standard library.

4. The method for testing medical data as in claim 1, wherein in the matching expression of step a, $$\backslash S = \frac{\sum_{i=1}^{n_2}(S_i - S'_i)^2}{\sum_{i=1}^{n_2} S_i^2},$$

wherein $n_2$ represents a quantity of initial boundaries of the medical datum, $S_i$ represents a farthest distance between two initial boundaries of the medical datum, and $S'_i$ represents a distance from an initial boundary of the medical datum to an initial boundary of the standard library.

5. The method for testing medical data as in claim 1, wherein in the matching expression of step a, $$\text{number} = \begin{cases} 0, & Num_a \neq Num_b \\ 1, & Num_a = Num_b \end{cases},$$

wherein $Num_a$ represents a quantity of information units comprised in the medical datum, and $Num_b$ represents a quantity of patterns comprised in the standard library.

6. The method for testing medical data as in claim 1, wherein in the matching expression of step a, $$\text{Sequence} = \frac{\sum_{i=1}^{n_3}(Seq_i - Seq_i')^2}{\sum_{i=1}^{n_3} Seq_i^2},$$

wherein $n_3 = Num_a - 1$, $Num_a$ represents a quantity of information units comprised in the medical datum, $Seq_i$ represents a distance between two adjacent information units, and $Seq'_i$ represents a distance between two adjacent patterns.

7. The method for testing medical data as in claim 1, wherein in the matching expression of step a, $$\text{Relation} = \begin{cases} 0, & Rel_a \neq Rel_b \\ 1, & Rel_a = Rel_b \end{cases},$$

wherein $Rel_a$ represents a quantity of semantic relationships comprised in the plurality of information units, and $Rel_b$ represents a quantity of semantic relationships comprised in the plurality of patterns.

8. The method for testing medical data as in claim 1, wherein in the matching expression of step a, $$\backslash s = \frac{\sum_{i=1}^{n_4}(b_i - b_i')^2}{\sum_{i=1}^{n_4} b_i^2},$$

wherein $n_4$ represents a quantity of character boundaries of the medical datum, $b_i$ represents a farthest distance between two character boundaries of the medical datum, and $b'_i$ represents a distance from a character boundary of the medical datum to a character boundary of the standard library.

9. The method for testing medical data as in claim 1, wherein in the matching expression of step a, $$\backslash B = \frac{\sum_{i=1}^{n_5}(B_i - B_i')^2}{\sum_{i=1}^{n_5} B_i^2},$$

wherein $n_5$ represents a quantity of non-character boundaries of the medical datum, $B_i$ represents a farthest distance between two non-character boundaries of the medical datum, and $B'_i$ represents a distance from a non-character boundary of the medical datum to a non-character boundary of the standard library.

10. The method for testing medical data according to claim 1, wherein step b further comprises the following steps:
   b1: calculating a similarity between the medical datum and the standard library by using the following formula, wherein C represents the similarity between the medical datum and the standard library, $c_j$ represents a similarity of each matching procedure in step a, and m represents a quantity of matching procedures in step a, $$C = \begin{cases} \min_{j=1}^{m}\{1 - c_j\}, & m \neq 0 \\ 0, & m = 0 \end{cases};$$

and
   b2: if $C \leq C_{min}$, determining that the medical datum is qualified, wherein $C_{min}$ represents a preset minimum similarity threshold.

\* \* \* \* \*